United States Patent [19]

Wright

[11] 4,359,361
[45] Nov. 16, 1982

[54] IMPULSE SEALER

[75] Inventor: Donald R. Wright, Midland, Mich.

[73] Assignee: The Dow Chemical Company, Midland, Mich.

[21] Appl. No.: 873,469

[22] Filed: Jan. 30, 1978

Related U.S. Application Data

[63] Continuation-in-part of Ser. No. 690,486, May 27, 1976, abandoned.

[51] Int. Cl.³ .................. B65B 51/14; B65B 51/32
[52] U.S. Cl. .................... 156/497; 156/498; 156/583.2; 53/548; 53/373; 62/5; 62/331; 219/243
[58] Field of Search .............. 53/452, 457, 479, 545, 53/548, 552, 329, 373; 156/498, 583, 583.2, 497; 62/5, 331, 6; 219/243, 143; 93/19, 20

[56] References Cited

U.S. PATENT DOCUMENTS

| 2,621,704 | 12/1952 | Langer | 219/243 X |
|---|---|---|---|
| 2,714,416 | 8/1955 | Fener | 156/583 |
| 2,796,914 | 6/1957 | Park | 156/583 X |
| 2,961,031 | 11/1960 | Fener | 219/243 |
| 3,026,681 | 3/1962 | Green | 62/5 |
| 3,173,273 | 3/1965 | Fulton | 62/5 |
| 3,340,129 | 9/1967 | Grevich | 156/498 |
| 3,389,033 | 6/1968 | Ullman, Jr. | 219/243 X |
| 3,496,049 | 2/1970 | Anderson | 156/583 X |
| 3,692,613 | 9/1972 | Pederson | 156/583 X |
| 3,942,330 | 3/1976 | Schroder | 62/5 |

FOREIGN PATENT DOCUMENTS 2234334  1/1973  Fed. Rep. of Germany ........ 53/373

Primary Examiner—Horace M. Culver
Attorney, Agent, or Firm—Lloyd E. Hessenaur, Jr.

[57] ABSTRACT

Layers of heat sealable material are pressed between opposed jaws, cut through, and simultaneously the edges along each side of the cut line are sealed using an improved impulse sealer and method wherein a narrow, internal cooling vein(s) or channel(s), defined near the working interface of the jaws, is cooled by a pressurized stream of refrigerated gas to provide forced cooling to the sealed edges during the cooling portion of the sealing cycle.

11 Claims, 6 Drawing Figures

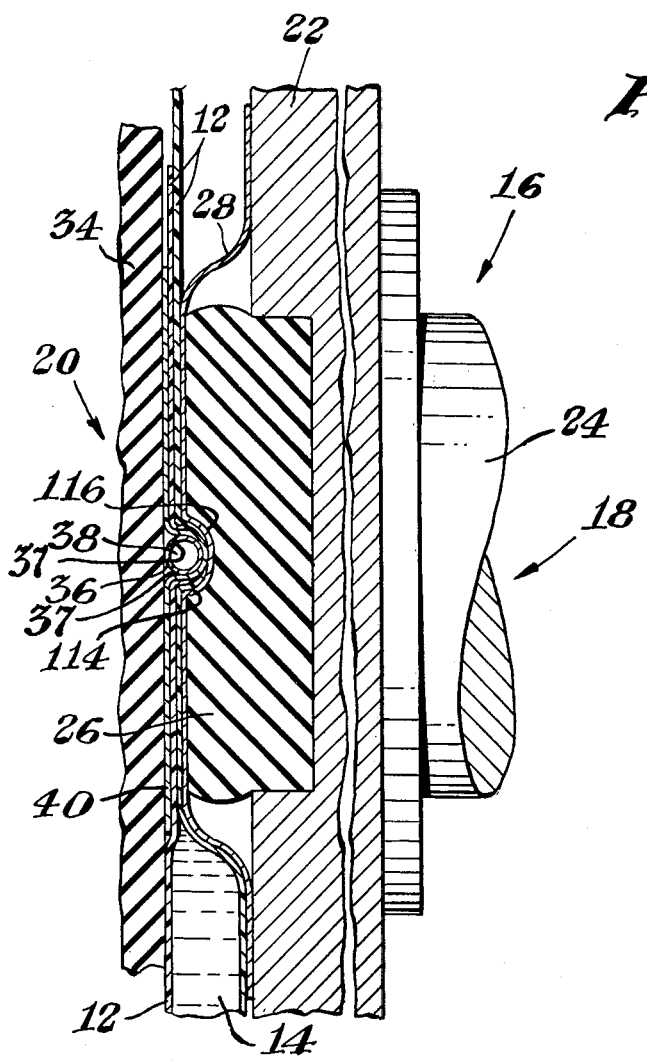
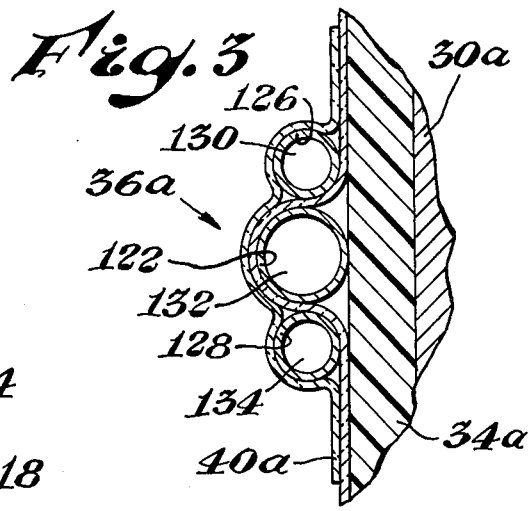
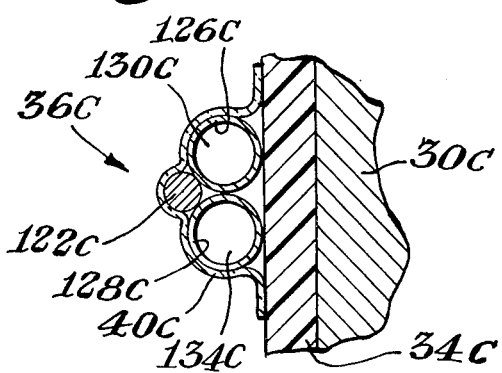
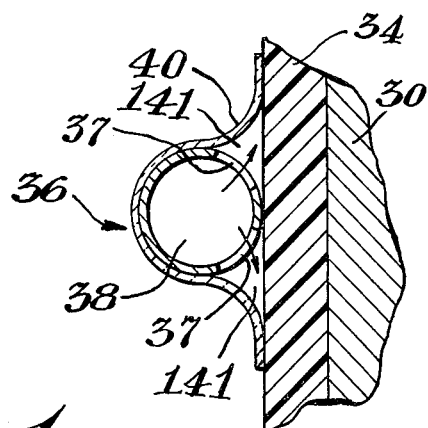

IMPULSE SEALER

PRIOR APPLICATION

This application is a continuation-in-part of application Ser. No. 690,486 filed May 27, 1976, and now abandoned.

FIELD OF THE INVENTION

The invention relates generally to the art of sealing heat sealable materials such as heat sealable thermoplastic film and sheet materials (i.e. web materials). The invention, more particularly, relates to improved methods and apparatus for heat sealing thermoplastic web materials in automatic form-fill-seal packaging machines.

BACKGROUND OF THE INVENTION

The steps of form, fill and sealing of thermoplastic packages can be carried on simultaneously and economically by various known automatic packaging machines. Economical pillow packages may be formed, for example, using automatic machines which convert flat web materials into a continuous tube, fill the tube, and seal the tube transversely at spaced intervals to complete a relatively simple and desirable filled package.

Automatic machines of this type have been highly successful in the past. Despite good acceptance in some areas, however, the technology is still plagued by a proneness to a high rate of seal imperfections in many applications.

The transverse seal is particularly difficult, and is commonly the leaking seal when defective products are produced on these machines. Because of the tendency for a commercially unacceptable rate of leakers, machines in this field have particularly not been able to satisfactorily service applications such as liquid pouch packaging where strong hermetic seals are especially required. Water based products can be handled somewhat better than oily or syrupy products which are extremely difficult to package. However, even for water based products, cycle times are oftentimes slow in respect to the upper production capacities of the machines since at fast cycles the quality of the seals can deteriorate rapidly. An optimum machine, of course, would form exceedingly tough seals at fast cycles to produce pouches that adequately protect the packaged contents.

Accordingly, it is an object of this invention to provide an improved method and apparatus for heat sealing thermoplastics and other heat sealable materials.

It is a further object of this invention to provide such methods and apparatus wherein the design of the same permits faster sealing cycles than is typically achieved on contemporary commercial equipment.

It is still a further object of this invention to provide such methods and apparatus wherein improved seal toughness is achieved to provide a more optimum package.

It is still a further object of this invention to provide a method and apparatus for heat sealing thermoplastic web materials that is highly suited for use on automatic form-fill-seal packaging machines and particularly machines used in the field of liquid pouch packaging.

These and other objects of the invention are achieved by the improved apparatus of the invention wherein superposed thermoplastic, heat sealable webs are pressed between opposed sealing jaw assemblies, one of which is a back-up jaw assembly and the other of which is a heat applying jaw assembly, the heat applying jaw assembly including an elongated sealing and cutting element which is workable against a compressible pad on the back-up jaw assembly, means to provide an impulse of current to heat the sealing and cutting element, at least one of said jaw assemblies defining a narrow internal cooling vein positioned generally immediately adjacent the working face thereof, and which is positioned generally contiguous to and along said sealing and cutting element at least in the closed jaw position, means communicating with said cooling vein to furnish a stream of pressurized gas thereto, and means to cool the stream of pressurized gas prior to said cooling vein.

The method of the invention briefly comprises the steps of pressing flatly together superposed layers of heat sealable thermoplastic material, cutting through the pressed together layers with heat and pressure, and simultaneously sealing the edges on each side of the cut line using an impulse heated element, positively cooling said edges, said cooling step comprising passing a pressurized stream of refrigerated gas through a cooling vein which is generally contiguous with and extends along said edges, particularly with means to promote a more even heat gradient across the seal area.

Yet additional objects and advantages of the present invention, and its numerous and cognate benefits, are even more apparent and manifest in and by the ensuing description and specification taken in conjunction with the accompanying drawing, in which wheresoever possible, like characters of reference designate corresponding material:

FIG. 2 is an enlarged cross-sectional view taken along reference line 2—2 of FIG. 1 showing the detail of the heat sealing and cutting element of the impulse sealer hereof, the sealing jaws in this view being shown in the closed position;

FIGS. 3–5 are enlarged cross-sectional views generally like FIG. 2, and showing modified forms of the invention; and FIG. 6 is an enlarged cross-sectional view generally like FIG. 2 only showing more detail of the embodiment of FIGS. 1 and 2.

DETAILED DESCRIPTION OF THE PREFERRED EMBODIMENTS

Figure 1:
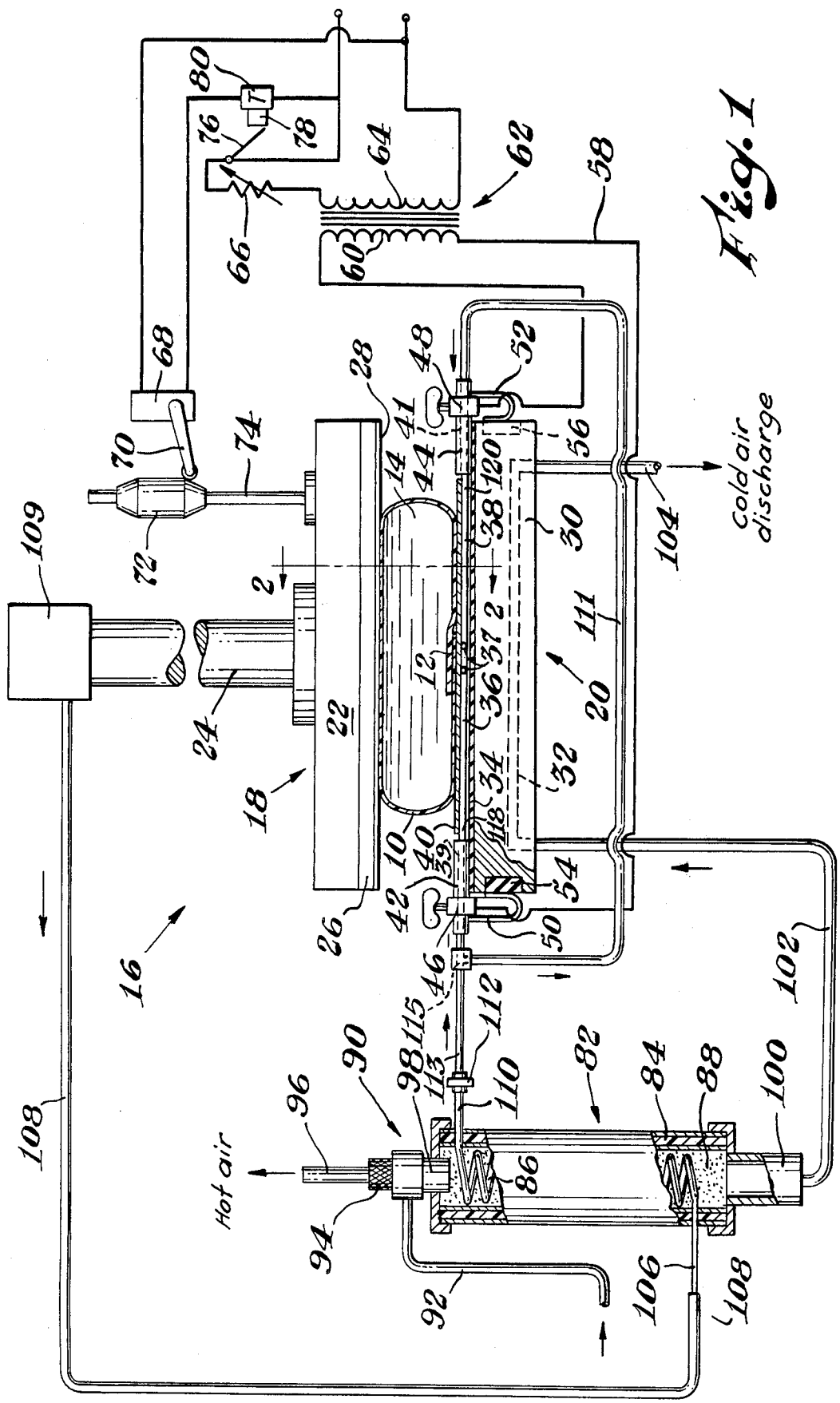
FIG. 1 is a generally schematic and diagrammatic view, with certain parts in cross-section, showing impulse sealing apparatus constructed according to the teachings and principles of this invention wherein the apparatus is viewed from the top in this Figure in reference to its incorporation in a vertical form, fill and seal automatic packaging machine.

Referring first to FIGS. 1, 2 and 6 the work product 10 is a heat sealable tube converted from a continuous web of flat film or sheet and sealed longitudinally in the overlap area as shown at 12. The tube is filled with controlled amounts of product 14. Apparatus which prepares the tube to this state is shown and typically represented by the apparatus of U.S. Pat. Nos. 2,432,373; 2,837,883; and 3,538,676, the teachings of which are herein incorporated by reference.

Sealing apparatus 16 for forming the transverse seals as shown comprises opposed sealing jaws comprising a movable pressure jaw assembly 18, and a stationary sealing jaw assembly 20. Alternatively, jaw assembly 18 can be stationary and jaw assembly 20 movable. The movable jaw assembly comprises a carrier plate 22 which is moved and returned from engagement and disengagement with the sealing jaw assembly by a reciprocally driven shaft 24. The carrier plate 22 evenly supports a resilient back-up element or compressible back-up pad 26 that serves as the back-up surface in forming the heat seal and which is, in turn, covered by a thin tape or layer of a release material 28.

The stationary jaw assembly comprises a carrier plate 30 which is hollow for admitting cooling gases through an internal cooling channel 32. The carrier plate 30 at its working face includes a layer of a rigid electrical insulation or an insulating layer 34. The insulating layer backs up and supports an elongated heat sealing and hollow cutting element 36 having a hollow core herein also referred to as a cooling vein or channel 38 (see FIGS. 2 and 6). Cooling vein 38 carries exhaust ports 37 to be described in more detail hereinafter. The sealing and cutting element is covered by a sheath or a layer 40 of a suitable release material. Electrical buss bars 42, 44 are secured to each end of the sealing and cutting element such as by soldering. The buss bars in turn are releasably held in clamps 46, 48. The clamps are mounted to carrier plate 30 through leaf springs 50, 52 which in turn are secured to insulation pads 54, 56, respectively, inlaid at each end of the carrier plate.

The heat sealing and cutting element is energized through a circuit 58 originating from a secondary winding 60 of a step-down transformer 62. The current and voltage to the primary winding 64 of the transformer is regulated by a rheostat 66. The circuit to the primary winding is intermittently energized by a normally open switch 68 through a mechanical trip arm 70. The trip arm is tripped by a cam 72 which is threadably adjustable on a shaft 74 secured to carrier plate 22 of the movable jaw assembly. The duration of the impulse or current through the primary winding is independently controlled through a second normally open switch 76, a solenoid 78 which actuates switch 76, and a timer 80 which actuates the solenoid.

Referring now specifically to FIG. 1, a heat exchanger 82 comprises a hollow insulated jacket 84. The jacket houses a hollow cooling coil 86 and is packed with a heat exchange medium preferably a mesh or screen of copper material 88. A vortex tube 90 is joined to one end of jacket 84 and is operated by compressed gas or air supplied from a line source 92. The vortex tube converts the compressed gas or air from source 92 into a cold stream and a hot stream in the known manner; the proportions and temperature of which are variable by means of an adjusting knob 94. The hot stream is vented to the atmosphere through the hot end or hot outlet 96 of the vortex tube. The cold stream is delivered through the cold end or outlet 98 of the vortex tube to the heat exchanger to cool coil 86, after which it is exhausted through a vortex muffler 100. The exhaust is piped to carrier plate 30 of the sealing jaw assembly by a connecting piping line 102 communicating with cooling channel 32. Eventually the spent gas, after cooling the carrier plate, is expelled to the atmosphere through an exhaust port or pipe 104. Port 104 should not be so small that the back pressure to the vortex tube amounts to more than about 5 pounds per square inch.

The cooling coil 86 of the heat exchanger includes an inlet end 106 which is supplied compressed gas from a second line source 108, and an outlet end 110. As shown, line source 108 is connected to the exhaust gas of cylinder 109 which uses pressurized gas to drive shaft 24. This avoids the need to have an additional source of pressurized gas or other fluid. The gas after travelling the length of the coil and being cooled is admitted into both ends 39 and 41 of the cooling vein 38 of the heating and sealing element 36 to provide cooling thereto. A plastic union 112 electrically insulates the outlet end of the coil from the electrically energized heating and cutting element. Extending from insert 112 is piping section 113 joined by an open T-connector 115 to end 39 of vein 38 and to piping line 111. Piping 111 is in open communication at its other end with end 41 of vein 38. Cooling gas can thus pass from outlet end 110 into both ends 39 and 41 of vein 38. Preferably, piping 111 is of rubber so as to be electrically insulated from the rest of element 36, and also provides some thermal insulation value. If extra thermal insulating is necessary, the same can be added around piping 111 as long as the insulation is not electrically conductive.

OPERATION

In operation, work product 10 is delivered to sealing apparatus 16 for formation of the transverse seals. The apparatus 16 cuts through the tube forming the top seal on the last filled tube segment, and simultaneously the bottom seal on the next-to-be-filled segment of the tube. Each sealing cycle is followed by a downward movement of the tube to the successive sealing position, and a filling step.

The sealing cycle is commenced by the programming of the form, fill and seal apparatus in the known manner, whereby the movable back-up jaw assembly is advanced by shaft 24 into engaging relationship with the stationary jaw assembly. Advancement of the movable jaw assembly trips switch arm 70 against cam 72 thereby energizing the primary winding of transformer 60 through closing switches 68 and 76, (the latter being closed by timer 80 through solenoid 78). The secondary winding thereupon provides an impulse of current across the heat sealing and cutting element to heat the element to a temperature sufficient to cut transversely across the tube. Simultaneously, heat is applied along each side of the cut line to seal the cut edges. Adjustment of the rheostat and the setting of the timer determine and control the duration of the impulse and the temperature to which the element is heated.

Reference is now made specifically to FIG. 2. In the clamped or engaged position, the opposed layers of the tube are pressed flatly together between the movable and stationary jaw assemblies. Generally simultaneously, the sealing and cutting element, heated by an impulse of current to the softening or melt temperature of the material, is pressed through both layers, to sever or cut the tube transversely with the assistance of the compressible back-up pad. The compressible back-up pad squeezes or conforms the cut ends or edges 114, 116 of the tube against the curved sides of the cutting and sealing element to provide pressure to seal the heat softened material along the extent of each cut edge. After sufficient heat or BTU's are transferred to the film, to effect the sealing condition, the timer times out thereby opening switch 76 and breaking and de-energizing the circuit. The cooling vein 38 is supplied by cooled gas from each of its ends 39 and 41 and exhausts near the center thereof through ports 37. The exhausted gas travels outwardly along the outside of the vein 38 under the sheath 40 to the atmosphere, like that shown in more detail in FIG. 6, where the exhaust gases pass through ports 37 outwardly through passageways 141 on each side of vein 38.

Ports 37 are of a sufficient size to permit adequate gas to pass therethrough and are preferably located on both sides of the vein to utilize both passageways. If located only on one side, the ports should be larger. By locating the exhaust ports in the middle region of the cooling vein, the distance the cooling gases have to travel therethrough is substantially reduced, by about half, thereby reducing the heat build-up which occurs when gases must travel the entire length of the cooling vein. Such an arrangement greatly promotes a more even heat gradient across the seal area of the joined web layers.

The ports 37 can have a diameter about equal to the inside diameter of the tube, and be spaced closely together as, for example, about four times the diameter. In one effective embodiment, where a vein had a 1/16 inch diameter, the holes were spaced ¼ inch apart. Because the cross-sectional area of the ports is less than the element 36, this section heats up to a greater degree, in one instance by as much as 30° F., than the rest of element 36 which helps to provide a quality seal in the area where the vertical seal intersects the horizontal seal so that three layers of material rather than two must be sealed together. The cooling vein, which can be continually cooled by the cold gas stream, is thus permitted to thereafter dominate to rapidly diffuse residual heat from the sealed edges 114, 116.

In actual production, it may be economically advantageous to conserve the quantity of cooled gas used by the system. One means to conserve cooling gas is to replace the vortex tube with one that delivers a lesser quantity. For example, a vortex tube with a 4 ft³/min. capacity could be replaced with one having a 2 ft³/min. capacity. This can be satisfactory if the gas introduced to the cooling coil in the heat exchanger is pulsated by some means such as by a solenoid valve or timed by the jaw movement. This pulsated cooled gas then only cools the sealing tube when required, which is after the heating cycle.

An even more efficient system can be utilized by supplying air as the gas to the cooling coil in the heat exchanger from the discharge side of the air cylinder that provides movement to the sealing jaw, as illustrated in FIG. 1. In operation, when the air to the coil is turned off, the air in the coil reaches a lower temperature than what it would have if it had been continuous. Because only half of the air volume has been cooled, less cooling air from the vortex tube is required to accomplish the necessary cooling function.

A limiting factor for utilizing this equipment may be the availability of 80 to 100 psi air that can be controlled to + or −5 psi of the chosen pressure setting in that range which is preferred to obtain consistent high quality seals.

Seals formed according to the invention show characteristic ripples. For example, a typical seal stucture obtained according to the invention frequently evidences a corrugated or rippled effect when viewed along its length. Such a seal structure is not as attractive, of course, as a smooth non-wrinkled seal that is normally attained by contemporary impulse sealing techniques. However, a simple test to determine attaining a strong seal prepared by this invention is to examine for the rippled characteristic of the seal indicating that the seal was able to relax or shrink as it cooled. Where the seal is very smooth on the other hand, it is oftentimes significantly weaker than the relaxed seal described above.

The selection of the heat sealing and cutting element may be determined on the basis of minimizing energy requirements. For example, in comparable embodiments, a heat sealing and cutting element of ⅛ inch O.D. stainless steel tubing, and 0.0225 inch wall thickness, required approximately 140 amps at 10 volts; whereas a smaller element of 1/16 inch O.D. stainless steel tubing and 0.005 inch wall thickness, required approximately 40 amps at 10 volts. Since both elements made relatively good seals, the choice of the smaller element would be preferred in this particular environment. Another preferred size tube element 36 has an O.D. of 0.067 inch and a wall thickness of 0.0085 inch and is also of stainless steel.

Other known materials, of course, may be selected to construct element 36, such as for illustration, Nichrome, Inconel, and Monel metal alloys. However, since forced cooling is practiced by the invention, the criteria for selecting the material differs over conventional practice in that higher energy loads must be carried by the element without change in its resistivity or its predicatable heating response. For example, excessive energy loads can shock the material or element 36 if it is of undercapacity to such load, such that its resistivity is altered. Accordingly the size or cross-section of the element and its material construction must be designed keeping in mind the higher energy capacity requirements of this invention in order to properly practice these teachings.

Forty durometer silicone rubber is generally preferred for the compressible back-up pad 26. Teflon coated glass tape or cloth is preferred for the release layer material. A 5 ml Teflon coated fiberglass cloth shows good performance in accomplishing the objectives of this invention as the release layer for the surface of the compressible back-up pad. A 3 mil cloth of like material is preferred as the sheathing for the heat sealing and cutting element in order to provide faster heat transfer to the work product.

Where cooling gas is simply introduced at one end of the cooling vein 38 and discharged at the other end, a heat gradient over the length of the sealing and cutting element builds up during operation. This is caused by the cooling air slowly warming as it passes along the length of the hot heat sealing and cutting element. The warmer air at the exhaust end may eventually cause this end of the sealing and cutting element to build up to a temperature that degrades the seal and release layer. Extra cooling of the pressurized gas stream to the sealing and cutting element substantially reduces the heat gradient problem, but if cooled too far can cause water in the lines to freeze and plug the system. For example, if such a problem is manifest, it is desirable to use more than one vortex tube (or a larger size vortex tube) to cool the heat exchanger, thereby reducing the temperature of the air admitted to the sealing and cutting element. However, this does increase the cost.

The preferred means to reduce the heat gradient to the desired level is to vent the cooled gas at or adjacent the center of the cooling vein, thus cutting the gradient effect essentially in half and keeping the gradient within acceptable limits. A less preferred solution, since it contemplates additions to the apparatus, is to alternate the flow direction of the cooling gas with each sealing cycle, or at longer intervals. For example, the cooled gas may be admitted at one end of the tube or element 36 for a predetermined period, and with the addition of appropriate valving, the gas flow can then be switched, and admitted at the opposite end of the tube or element.

Accordingly since the directionality of flow is changed based on a predetermined cycle, the heat gradient may be controlled within practically any limits desired. In this case, the ports can be located more towards the ends 118 and 120 rather than centrally of vein 38 if desired.

The preferred temperature of the cooling gas, as it leaves, or is exhausted from element 36 may be measured with the heat sealing and cutting element 36 turned off to obtain a stabilized reading, and thereafter with element 36 intermittently heated to get a cyclic or varying reading. For example, with the circuit to element 36 de-energized, the temperature of the exhaust cooling gas preferably stabilizes at a temperature of about 35° F. to 40° F. but may even be lower in some instances. During operation, with element 36 being intermittently heated, the temperature of the exhaust gas cycles over a temperature range wherein at the high temperature reading of the cycle, the exhaust gas will typically be about 50° F. to about 10° F. warmer than the temperature of the exhaust gas as measured at its lowest reading in the cycle. Most beneficially, the pressure of the cooling gas stream, (as measured in the vicinity of clamp 46) is at an input pressure of about 60 psig or greater, and most preferably at about 80 psig which can be controlled by a pressure control valve on the inlet side of the heat exchanger. This reduces cycling pressures from the air compressor and accumulator tanks (not shown).

In respect now to further refinements of the invention the shape of the sealing and cutting element is preferably cylindrical as shown. It is desirable in some applications to shape the crown or high point of the sealing and cutting element by glass blasting or by other suitable means in order to provide a shallow cutting ridge. Also it is understood that the heat sealing and cutting element may take other forms. For example, heat sealing and cutting elements of triangular, oval and other shapes are known to the art, and by providing such known shapes with a hollow core or cooling vein as taught herein, and by cooling the core of the element by a stream of pressurized refrigerated gas, improved impulse sealing may be obtained according to these teachings embodying these known modifications.

In respect now to the buss bars shown at 42, 44 in FIG. 1, the material used is preferably brass, and of sufficient mass to serve the function of a heat sink. In this regard, the extreme ends of the sealing and cutting element 118, 120, shown in FIG. 1, make infrequent or noncontact with the tube or work product. Since the tube repeatedly withdraws heat from the sealing and cutting element, the central part of the element which makes repeated contact with the tube, tends to remain relatively cooler than the extreme end areas 118, 120. This can eventually cause problems in the deterioration of the sheathing and the release layers unless stabilized. The buss bars 40 and 44 acting as sinks, thus tend to withdraw heat build-up from the extreme ends of the sealing and cutting element to keep these areas relatively cooler.

FIG. 6 represents a more detailed view of a portion of FIG. 2 wherein a single component heat sealing and cutting element 36 is utilized having a hollow core or cooling vein 38 of a structure. The heat sealing and cutting element 36, which is impulse heated, is cooled by the central cooling vein 38 being vented through perforation means or ports 37 intermediate the ends 39 and 41 of the cooling vein in order to expel the cooling gas along the region 141 adjacent each side of the element. Thus, gas expelled or vented essentially along the entire length of the cutting and sealing element 36 is able through the perforation means 37 to provide cooling locally along the adjacent sides of the sealing and cutting element to further assist with heat removal from the element as the gas in passageway 141 is still cooler than the element. Most preferably element 36 is closed ended, with gas piped in to each end thereof so that essentially the entire exhaust of the cooling gas is through the perforation means 37. The use of the sealing element 36 forms a rippled seal structure as described generally above.

Referring now to FIGS. 3–5, various modified forms of the heat sealing and cutting element are shown. In FIG. 3, the heat sealing and cutting element 36a comprises an impulse heated central component or tube 122. Disposed intimately along each side of component 122, and electrically insulated therefrom by a layer of insulating material 124, are a pair of thin hollow components or tubes 126, 128. A second layer of material 40a, which serves as a release layer, forms a covering for the above described components. The heat sealing and cutting element 36a defines multiple cooling veins 130, 132, 134 which are in the form of hollow cores defined in components 122, 126 and 128, respectively. The use of the several cooling veins thus permits gas under pressure to flow through the heat sealing and cutting 36a from its opposite ends respectively, in order to counterbalance the effect of any build-up of a detrimental heat gradient over the length of the element. For example, the gas cooling the outer veins 130, 134 may be admitted from one end of the heat sealing and cutting element 36a, whereas cooling gas supplied to the central vein 132 may be admitted from the opposite end or far end thereof so as to flow counter to the streams in the cooling veins 130, 134.

Thus, the heat sealing and cutting element 36a can be designed by the foregoing principles to make available a generally more uniform cutting and sealing temperature across the entire length of element 36a in order to prevent hot spots or build-up of hot spots as might eventually deteriorate the synthetic material of the release and insulation layers, or which would tend to excessively heat the film in localized areas because of excessive build-up of a substantial heat gradient.

FIG. 4 shows a generally similar heat sealing and cutting element 36b with the exception that the current carrying component or central component 122b thereof is a solid impulse heated component absent the cooling vein described above. The outer components 126b, 128b, which are electrically insulated from the central element and therefore not subjected to direct impulse heating, define cooling veins 130b, 134b in which counter flowing streams may be used to provide the forced cooling step disclosed in these teachings.

FIG. 5 illustrates further a three component sealing and cutting element 36c which is generally similar to that described with respect to FIG. 4 wherein the same includes a central impulse heated component 122c, and immediately adjacent thereto a pair of side-by-side thin hollow tubes or components 126c, 128c, each defining a cooling vein 130c, 134c. In this instance, however, the outer components 126c, 128c are not electrically insulated from the central component 122c and thus will be heated by the impulse of current. However, the elimination of the insulation layer provides faster cooling in the cycle immediately following the application of the impulse of current in order to meet the objectives of the invention. The design here can provide excellent seals. However, as may be noted, since three rather than one component are being impulse heated, generally higher energy usage may be expected.

While the foregoing invention has been described particularly in regard to vertical form, fill and seal automatic packaging machines, it is obvious that the invention has broader applications. For example, the invention may be used generally in applications for form, fill and sealing of packages, as opposed to the species' vertical form, fill and seal machine described above. Also it is understood that this teaching is to be treated as illustrative of the invention rather than comprehensive and that further and various modifications of the apparatus and methods hereof are obvious in view of these teachings. For example, the cooling gas may be applied cyclically after each impulse heating step, the latter being the preferred form of the invention. It should also be apparent that the cooling vein(s) may be positioned differently such as on or near the surface of the pressure supplying or back-up jaw, rather than the preferred form where the same is integrally included as a part of the sealing and cutting element. Accordingly, it is intended to limit the scope of this invention only to the extent indicated in the appended claims.

What is claimed is:

1. An apparatus wherein superposed thermoplastic, heat sealable webs are passed between opposed sealing jaw assemblies, one of which is a back-up jaw assembly and the other of which is a heat applying jaw assembly, the heat applying jaw assembly including an elongated sealing and cutting element which is workable against a back-up jaw assembly, means to heat the sealing and cutting element, the improvement which comprises at least one of said jaw assemblies defining an elongated cooling vein having ends closed to the atmosphere and positioned generally immediately adjacent the working face thereof, and which is positioned generally contiguous to and along said sealing and cutting element at least in the closed jaw position, means communicating with said cooling vein adjacent its ends to furnish a stream of pressurized gas thereto flowing from the ends towards the center of the cooling vein, means to cool the stream of pressurized gas prior to said cooling vein, said cooling vein including venting means located intermediate said ends to exhaust the cooling gas and provide a more even heat gradient across the seal area of said webs.

2. The apparatus of claim 1 wherein the venting means is located at or adjacent the longitudinal center of the cooling vein, whereby the cooled gas travels substantially along only one-half of the cooling vein length before being exhausted to provide an essentially even heat gradient across the seal area.

3. The apparatus of claim 2 wherein the sealing and cutting element includes means permitting the exhausted gas to travel along the sides of the sealing and cutting element to further assist with heat removal from said element.

4. The apparatus of claim 1 wherein said communicating means is connected to refrigerated cooling gas supply means.

5. An apparatus wherein superposed thermoplastic heat sealable webs are pressed between opposed sealing jaw assemblies, one of which is a back-up jaw assembly and the other of which is a heat applying jaw assembly, the heat applying jaw assembly including an elongated sealing and cutting element which is workable against a back-up jaw assembly, means to provide heat to the sealing and cutting element, the improvement which comprises at least one of said jaw assemblies defining elongated substantially parallel cooling veins positioned generally immediately adjacent the working face thereof, and which are positioned generally contiguous to and along said sealing and cutting element at least in the closed jaw position, means communicating with said cooling veins to furnish streams of pressurized gas thereto, and means to cool the streams of pressurized gas prior to said cooling veins, said means communicating with said cooling veins supplying pressurized gas thereto and directing and cooling gas in one of said cooling veins counter in direction of the direction of flow of said cooling gas in another of said cooling veins.

6. The apparatus of claim 4 or 5 wherein said back-up jaw assembly carries a compressible pad against which the sealing and cutting element works, the means to provide heat to the sealing and cutting element comprises being an impulse of current, and said cooling veins being thin walled and internally located with respect to one of said jaw assemblies.

7. The apparatus of claim 5 wherein said communicating means is connected to refrigerated cooling gas supply means.

8. An apparatus wherein superposed thermoplastic, heat sealable webs are pressed between opposed sealing jaw assemblies, one of which is a back-up jaw assembly and the other of which is a heat applying jaw assembly, the heat applying jaw assembly including an elongated sealing and cutting element which is workable against a back-up jaw assembly, means to heat the sealing and cutting element, the improvement which comprises at least one of said jaw assemblies defining an elongated cooling vein having ends closed to the atmosphere and positioned generally immediately adjacent the working face thereof, and which is positioned generally contiguous to and along said sealing and cutting element at least in the closed jaw position, means communicating with said cooling vein adjacent its ends to furnish a stream of pressurized gas thereto flowing from the ends towards the center of the cooling vein, means to cool the stream of pressurized gas prior to said cooling vein, said cooling vein including venting means located intermediate said ends to exhaust the cooling gas and provide a more even heat gradient across the seal area of said webs, an air cylinder having an air discharge means controlling movement of the jaw assembly, said air discharge means being in open communication with the gas supply line for supplying cooled gas to the cooling vein, the air being discharged intermittently as the cylinder operates so that lesser quantities of air need be cooled than if the gas supply were continuous.

9. The apparatus of claim 8 wherein means are included to admit gas from one end of the cooling vein then to the other sequentially to control gas flow.

10. An apparatus wherein superposed thermoplastic, heat sealable webs are pressed between opposed sealing jaw assemblies, one of which is a back-up jaw assembly and the other of which is a heat applying jaw assembly, the heat applying jaw assembly including an elongated sealing and cutting element which is workable against a compressible pad on the back-up jaw assembly, means to provide an impulse of current to heat the sealing and cutting element, the improvement which comprises at least one of said jaw assemblies defining elongated internal thin walled substantially parallel cooling veins positioned generally immediately adjacent the working face thereof, and which are positioned generally contiguous to and along said sealing and cutting element at least in the closed jaw position, means communicating with said cooling veins to furnish streams of pressurized gas thereto, and means to cool the streams of pressurized gas prior to said cooling veins, said means communicating with said cooling veins supplying pressurized gas thereto and directing and cooling gas in one of said cooling veins counter in direction to the direction of flow of said cooling gas in another of said cooling veins.

11. The apparatus of claim 10 wherein said communicating means is connected to refrigerated cooling gas supply means.

* * * * *